3,508,939
Patented Apr. 28, 1970

3,508,939
FIBERIZABLE GLASS COMPOSITIONS
Bernard Laurent, Paris, and Claude Haslay, Ronquerolles-par-Agnetz, France, assignors to Compagnie de Saint-Gobain, Neuilly-sur-Seine, Hauts-de-Seine, France
No Drawing. Filed Dec. 29, 1965, Ser. No. 517,486
Claims priority, application France, Jan. 14, 1965, 1,906
Int. Cl. C03c 13/00, 3/10
U.S. Cl. 106—50         5 Claims

ABSTRACT OF THE DISCLOSURE

Although the use of glass fibers is very great the number of glasses which can be used in fibering is very small. The compositions which are satisfactory are extremely limited because of the requirements of the several fibering processes. The requirements are easy to state and hard to meet: The glass must have high resistance to attack by water; high resistance to attack by chemical agents which are present in the air and other places of use; substantial inertia to objects with which they are used; of low viscosity; of low melting point; of low material cost and low cost of fibering. Highly satisfactory fibers have as their essential constituents 11–13% $Na_2O$, 2–3% $K_2O$, 5 to 6.5% CaO, 5 to less than 6% $B_2O_3$, 0.7 to 1.5% ZnO, 1.5 to 2.5% $ZrO_2$, 57 to 60% $SiO_2$, 6 to 7.5% $Al_2O_3$, 2 to 2.5% MgO, 1.0 to 2% BaO, 0.5 to 1.5% F, the proportion of MgO to CaO being 0.3 to 0.5, the proportion of $K_2O$ to $Al_2O_3$ being 0.35 to 0.45, the proportion of combined MgO, CaO, BaO, and ZnO to combined $Na_2O$ and $K_2O$ being 0.7 to 0.85, and the proportion of combined $Al_2O_3$ and $ZrO_2$ to combined $Na_2O$ and $K_2O$ being 0.55 to 0.62, the content of alkali oxide being 13.5 to 15%.

This invention relates to novel glass compositions and particularly to glass fibers of novel constitution.

Although the use of glass fibers is very great the number of glasses which can be used in fibering is very small. The compositions which are satisfactory are extremely limited because of the requirements of the several fibering processes. The requirements are easy to state and hard to meet: The glass must have high resistance to attack by water; high resistance to attack by chemical agents which are present in the air and other places of use; be substantial inert to objects with which they are used; of low viscosity; of low melting point; of low material cost and low cost of fibering. No known glass satisfies or even approaches all these requirements.

It is the object of the present invention to make novel glass which is better than any previous glass in one or several of these categories, especially in low cost of materials, low viscosity, low cost of fusion, high resistance to attack, and inert toward associated things, such as the metal of centrifugal spinners at fibering temperature.

It is also desired to attain such objects with glasses having a liquidus temperature (upper temperature of devitrification) which is at least 50° C. lower than the working temperature corresponding to a viscosity of 3000 poises. The advantage of this property of the new glasses is that the cooler parts of the fibering apparatus are still at a temperature higher than the liquidus, devitrification is avoided, stagnation in cooler areas does not occur, free glass flow is promoted, and the orifices of spinners are kept free of obstruction by glass of high viscosity.

The objects of the invention are accomplished, generally speaking, by glass having as its essential constituents 5 to 6.5% CaO, 5 to 6% $B_2O_3$, 0.7 to 1.5% ZnO, 1.5 to 2.5% $ZrO_2$, and the balance $SiO_2$, $Al_2O_3$, MgO, $Na_2O$, $K_2O$, F, and BaO with the optional inclusion of $Fe_2O_3$, the proportion of MgO to CaO being 0.3 to 0.5, the proportion of $K_2O$ to $Al_2O_3$ being 0.35 to 0.45, the proportion of combined MgO, CaO, BaO, and ZnO to combined $Na_2O$ and $K_2O$ being 0.7 to 0.85, and the proportion of combined $Al_2O_3$ and $ZrO_2$ to combined $Na_2O$ and $K_2O$ being 0.55 to 0.62, the content of alkali oxide being 13.5 to 15%.

These glasses contain silica, alumina, magnesium oxide and barium oxide, and in addition 5 to 6.5% of lime, 5 to 6% of $B_2O_3$, 0.7 to 1.5% of ZnO, and 1.5 to 2.5% of $ZrO_2$. The alkali oxide content lies in the range 13.5 to 15% and the following proportions are to be observed:

$$\frac{MgO}{CaO} \quad 0.3 \text{ to } 0.5$$

$$\frac{K_2O}{Al_2O_3} \quad 0.35 \text{ to } 0.45$$

$$\frac{MgO+CaO+BaO+ZnO}{Na_2O+K_2O} \quad 0.7 \text{ to } 0.85$$

$$\frac{Al_2O_3+ZrO_2}{Na_2O+K_2O} \quad 0.55 \text{ to } 0.62$$

The composition of these glasses in weight percent is as follows:

TABLE I $SiO_2$—57 to 60% and preferably 58.2 to 59.2%
$Fe_2O_3$—0 to 1% and preferably 0.75 to 0.85%
$Al_2O_3$—6 to 7.5% and preferably 6 to 7%
CaO—5 to 6.5% and preferably 5.80 to 6.50%
MgO—2 to 2.5% and preferably 2.10 to 2.40%
$Na_2O$—11 to 13% and preferably 11.10 to 12.30%
$K_2O$—2 to 3% and preferably 2.10 to 2.80%
$B_2O_3$—5 to 6% and preferably 5.20 to 5.80%
BaO—1 to 2% and preferably 1.40 to 1.80%
$ZrO_2$—1.5 to 2.5% and preferably 1.90 to 2.50%
F—0.5 to 1.5% and preferably 0.80 to 1.20%
ZnO—0.7 to 1.5% and preferably 0.90 to 1.30%

These glasses are useful for making glass fibers by any fibering method or apparatus but especially for the projection of molten glass by centrifugal force through spinner orifices. It also may be melted, divided, and drawn into fibers, it may be fibered by blowing with steam or air, it may be fibered by burners or blowpipes, and it can be fibered by being dropped on a spinning disk or rotating high speed cylinder.

These glasses have low fusion temperatures, which reduces the quantity of heat required to process them, reduces the cost of manufacture, and reduces the size and cost of machinery. Another advantage is that, because of their low working temperatures the costly fibering apparatus characteristic of prior practice may be replaced with less costly special steels, and that all fibering apparatus will have substantially longer life.

These glasses have an upper temperature of devitrification (liquidus) of at least 50° C. less than the working temperature which corresponds to a viscosity of 3000 poises. Because of this the coldest parts of centrifugal fibering apparatus are hotter than the liquidus temperature, the flowing glass does not stagnate on colder parts of the fibering apparatus, and the obstruction of orifices by devitrified glass does not occur.

These glasses have maximum speeds of devitrification not greater than 0.3 micron per minute, so that even below the liquidus temperature, and as far as 50° C. below it, devitrification is zero or so negligible as to permit correct fibering for a long time when conditions require the lowering of fibering temperature.

These glasses have great resistance to attack by water and chemical agents, a quality which is essential for glasses which are to be used in making fibers of small diameter, a use to which these glasses are particularly adapted. Because of these properties these glasses are particularly useful in manufacturing light fibrous insulation of great insulating power and of fiber diameter on the order of 3–4 microns average. These fibers may be deposited in blankets and used as such for some purposes, or they may be autogenously agglomerated by heating for other uses, or they may be agglomerated by the use of resinous impregnating agents of known types. By these means there have been produced fibrous insulating bodies having a coefficient of thermal conductivity of $35 \times 10^{-3}$ kcal./m.h.° C. for a density of 10 kg./m.³, and of $31 \times 10^{-3}$ kcal./m.h.° C. for a density of 16 kg./m.³, and of $28 \times 10^{-3}$ for a density of 30 kg./m.³.

The resinous impregnating agent may be of thermohardening type such as phenol-formaldehyde resin, or a copolymer such as phenol-formaldehyde-urea or phenol-formaldehyde-melamine.

EXAMPLE 1

Raw materials were mixed to provide a composition within the limits of the preferred glasses of Table I. The mixed raw materials, having a total weight of 10 kg., were placed in an electric furnace which was heated to a temperature of 1350° C. The raw materials used were the oxides as stated, except that phonolite was used as the source of alumina, dolomite as the source of magnesium oxide, fluorspar for fluorine, the latter two furnishing sufficient CaO. The ability to use these raw materials is an advantage of the invention, contributing to low cost of materials, advantageous conditons of operation, and a lower priced product. The glass had the composition by analysis of:

| | |
|---|---:|
| $SiO_2$ | 58.65 |
| $Fe_2O_3$ | 0.85 |
| $Al_2O_3$ | 6.15 |
| CaO | 6.30 |
| MgO | 2.30 |
| $Na_2O$ | 11.15 |
| $K_2O$ | 2.50 |
| $B_2O_3$ | 5.60 |
| BaO | 1.75 |
| $ZrO_2$ | 2.40 |
| F | 1.05 |
| ZnO | 1.20 |
| $SO_3$ | 0.30 |
| $TiO_2$ | 0.10 |
| MnO | 0.07 |
| O deducted | 0.43 |

Its fusion temperature was 1320° C., its dilatometric softening point 585° C., and is attackability by water 6.8 mg. Its upper temperature of devitrification was 950° C. and its maximum speed of devitrification occurred at 860° C., at which the speed was 0.2 micron per minute. Its viscosity in poises at different temperatures was:

| Temperature in ° C.: | Viscosity in poises |
|---|---:|
| 900° | 25,300 |
| 1000° | 3,510 |
| 1010° | 3,000 |
| 1100° | 850 |
| 1200° | 270 |

The standard glass used for fibers in the prior art is called E glass and it may be used for comparative purposes. Its composition is $SiO_2$, 54.2%; $Al_2O_3$, 15%; CaO, 17%; MgO, 4.5%; $Na_2O+K_2O$, 0.6%; $B_2O_3$, 7.8%; F, 0.5%; O (to deduct), 0.2% by weight. For comparison we may use superfine fibers, of E glass and the new glass, of 3 microns average diameter. The temperature of fusion of E glass is 1580° C., or 1460° if cullet is used, whereas the new glass fuses at 1380° C., a substantial advantage in cost of heating and to the machinery, which can be run at 115° C. lower temperature with the new glass. When made into identical batts of 8 kg./m.³ density the comparative losses under heat treatment were only 22–34% for this glass, after aging in an autoclave, against 35–50% for E glass. Thus, this new glass is cheaper and better than the standard E glass.

In making the new glass at the fusion temperature noted above one may use 42.42 parts by weight of sand, 29.31 of phonolite, 11.11 of dolomite, 8.67 of desybor, 2.52 of fluorspar, 2.99 of zirconiferous sand, 2.07 of barium carbonate, 11.35 of sodium carbonate, 0.031 of wood charcoal, and 1.1 of zinc oxide. This will produce a glass which is representative of the new family and which has the composition $SiO_2$, 58.65% by weight; $SO_3$, 0.3%; $Fe_2O_3$, 0.85%; $Al_2O_3$, 6.1%; MnO, 0.07%; ZnO, 1.2%; CaO, 6.3%; MgO, 2.3%; $Na_2O$, 11.15%; $K_2O$, 2.5%; $B_2O_3$, 5.6%; BaO, 1.75%; $TiO_2$ 0.1%; $ZrO_2$, 2.4%; and F, 1.05%. This glass has a maximum rate of devitrification at 860° C., and substantially none above 930° C. The working temperature corresponding to a viscosity of 3000 poises is, consequently, more than 50° higher than the liquidus temperature, a substantial advantage.

These glasses can also be used for the manufacture of products other than fibers and they have the advantage of possessing very large specific surfaces with relation to their volume. Thus they may be used for textile fibers, small glass plates, and thin glass films. They have particular use in the mineral textile industry for the manufacture of continuous fibers which are capable of being transformed into thread for the textile industry; for this particular use it is advisable to use platinum fibering instruments supplied either directly by molten hot glass or by cold glass in the form of glass scrap in fragments or marbles.

The glasses of this invention have numerous advantages, among which the following are noteworthy: the cost of the raw materials is low, the melting costs are reduced in comparison to prior art glasses because of lower fibering temperature, the cost of upkeep of fibering apparatus is reduced because of low viscosity, and the length of life of the fibering apparatus is substantially extended because of the use of relatively low fibering temperatures. The glasses have great resistance to attack by water and chemical agents and they are relatively inert and noncorrosive toward the materials with which they come in contact. Their attackability (DGG) gives a dry residue inferior to 8 mg. The viscosity of these glasses is low, being 3000 poises at a temperature of 1015° C. or less. These glasses have thermal constants which allow them to be used as thermal insulation at medium and high temperatures, especially as their melting points (dilatometric) are equal to or above 580° C. They can be fritted.

Although it is not necessary to the comprehension of the invention brief comment on the function of certain ingredients may be useful:

$B_2O_3$ aids fusion, resists alteration, and reduces the tendency to devitrify. The limits stated are to be observed.

BaO lowers the viscosity and the upper temperature of devitrification. The limits of composition should be observed, particularly the upper limit.

ZnO is essential, lowers the viscosity, and materially lowers the upper temperature of devitrification. The limits should be observed. In this and in other cases, to depart from the limits stated is either to degrade the product or increase the cost without compensating advantage.

A limitation of alkalies to 13.5 to 15% is necessary if satisfactory viscosity is to be maintained at working temperatures, and to maintain resistance to attack. The ratio expressed above, containing six oxides, is necessary to establish good resistance to alteration, low devitrification, and high thermal constants. Outside the range the attackability increases rapidly and the melting point increases, or the liquidus temperature and the speed of devitrification increases. The ratio expressed above, containing four oxides, should be maintained for the same reasons. The ratios of $K_2O$ to $Al_2O_3$, and of MgO to CaO permit the use of phonolite, dolomite, and fluorspar as raw materials; with compositions having most fluorine this will be about 0.3 and for those containing the least this will be about 0.5.

The glass of Example 1 corresponds to the requirements of this invention and is particularly adapted to use in making fibers by centrifugal processes. It is also useful for making continuous filaments for textile use. In the case of textile filaments it may be desired to make very clear glass, in which case the raw material may advantageously be low in iron oxide. Nevertheless, the specific glass recited in Example 1, which contains 0.85% of $Fe_2O_3$, is very satisfactory for this purpose.

As many apparently widely different embodiments of the present invention may be made without departing from the spirit and scope thereof, it is to be understood that the invention is not limited to the specific embodiments.

What is claimed is:
1. Glass adapted for fibers consisting essentially of

| | Percent |
|---|---|
| $Na_2O$ | 11 to 13 |
| $K_2O$ | 2 to 3 |
| CaO | 5 to 6.5 |
| $B_2O_3$ | 5 to less than 6 |
| ZnO | 0.7 to 1.5 |
| $ZrO_2$ | 1.5 to 2.5 |
| $SiO_2$ | 57 to 60 |
| $Al_2O_3$ | 6 to 7.5 |
| MgO | 2 to 2.5 |
| BaO | 1 to 2 |
| F by weight | 0.5 to 1.5 | the proportion of MgO to CaO being 0.3 to 0.5, the proportion of $K_2O$ to $Al_2O_3$ being 0.35 to 0.45, the proportion of combined MgO, CaO, BaO, and ZnO to combined $Na_2O$ and $K_2O$ being 0.7 to 0.85 and the proportion of combined $Al_2O_3$ and $ZrO_2$ to combined $Na_2O$ and $K_2O$ being 0.55 to 0.62, the content of alkali oxide being 13.5 to 15%, and in which the temperature of devitrification is at least 50° C. less than the working temperature corresponding to a viscosity of 3000 poises and which glass has a maximum speed of devitrification not greater than 0.3 micron per minute.

2. Glass fibers having the composition of claim 1.
3. Glass fibers having the composition of claim 1.
4. Glass fibers according to claim 1 having the following composition by weight percent: $SiO_2$ 58.2 to 59.2%, $Fe_2O_3$ 0.75 to 0.80%, $Al_2O_3$ 6 to 7%, CaO 5.8 to 6.5%, MgO 2.1 to 2.4%, $Na_2O$ 11.1 to 12.3%, $K_2O$ 2.1 to 2.8%, $B_2O_3$ 5.2 to 5.8%, BaO 1.4 to 1.8%, $ZrO_2$ 1.9 to 2.5%, F 0.8 to 1.2%, ZnO 0.9 to 1.3%.
5. Glass fibers according to claim 1 approximating the following composition by weight percent: $SiO_2$ 58.65%, $SO_3$ 0.3%, $Fe_2O_3$ 0.85%, $Al_2O_3$ 6.15%, MnO 0.07%, Zn. 1.2%, CaO 6.3%, MgO 2.3%, $Na_2O$ 11.15%, $K_2O$ 2.5%, $B_2O_3$ 5.6%, BaO 1.75%, $TiO_2$ 0.1%, $ZrO_2$ 2.4%, and F 1.05%.

References Cited

UNITED STATES PATENTS

| 2,877,124 | 3/1959 | Welsch | 106—54 |
| 3,013,888 | 12/1961 | Lajarte | 106—50 |
| 3,022,210 | 2/1962 | Philipps | 161—107 X |
| 3,095,311 | 6/1963 | Wranau et al. | 106—50 |

FOREIGN PATENTS 643,414   5/1964   Belgium.

HELEN M. McCARTHY, Primary Examiner
W. R. SATTERFIELD, Assistant Examiner

U.S. Cl. X.R.
106—52, 54

PO-1050
(5/69)

UNITED STATES PATENT OFFICE
CERTIFICATE OF CORRECTION

Patent No. 3,508,939          Dated April 28, 1970

Inventor(s) Bernard Laurent and Claude Haslay

It is certified that error appears in the above-identified patent and that said Letters Patent are hereby corrected as shown below:

Column 6, line 9, (Claim 3), change "fibers" to -- films --.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents